United States Patent
DeCoster et al.

(10) Patent No.: US 7,381,925 B2
(45) Date of Patent: Jun. 3, 2008

(54) TORCH CONNECTION DETECTION SYSTEM AND METHOD

(75) Inventors: Albert J. DeCoster, Kaukauna, WI (US); Stephen P. Ferkel, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 335 days.

(21) Appl. No.: 10/708,657

(22) Filed: Mar. 17, 2004

(65) Prior Publication Data
US 2005/0205542 A1   Sep. 22, 2005

(51) Int. Cl.
*B23K 9/10*   (2006.01)
(52) U.S. Cl. .................................. 219/137.62
(58) Field of Classification Search ........... 219/137.62, 219/136, 120, 121.49
See application file for complete search history.

(56) References Cited

U.S. PATENT DOCUMENTS

| | | | | |
|---|---|---|---|---|
| 2,510,207 A | * | 6/1950 | Behnke et al. | ......... 219/137.42 |
| 5,266,778 A | * | 11/1993 | Bailey | ......................... 219/497 |
| 5,719,367 A | * | 2/1998 | Young | ..................... 219/86.31 |
| 6,026,682 A | * | 2/2000 | McCormick | .................. 73/196 |
| 2005/0016978 A1 | * | 1/2005 | Stein et al. | ............. 219/137.62 |
| 2005/0016979 A1 | * | 1/2005 | Stein et al. | ............. 219/137.62 |

FOREIGN PATENT DOCUMENTS

| | | | |
|---|---|---|---|
| FR | 2 536 320 | * | 5/1984 |
| WO | WO 00/44523 | * | 8/2000 |
| WO | WO 02/43914 A1 | | 6/2002 |

* cited by examiner

*Primary Examiner*—Kevin P Kerns
(74) *Attorney, Agent, or Firm*—Ziolkowski Patent Solutions Group, SC

(57) ABSTRACT

A cooling system is disclosed that is designed to inhibit coolant flow to a welding-type component if connection of the welding-type component to a coolant outlet is not deemed present.

31 Claims, 4 Drawing Sheets

TORCH CONNECTION DETECTION SYSTEM AND METHOD

BACKGROUND OF INVENTION

The present invention relates generally to welding-type systems and, more particularly, to a method and apparatus of only allowing coolant flow from a coolant source to a welding-type component if the welding-type component is deemed connected to the coolant source.

It is well known that certain welding processes such as heavy-duty TIG (tungsten inert gas) welding generate considerable amount of heat during the welding process. With TIG welding, a welding component or welding torch is commonly used to hold a tungsten electrode that is heated to join metals through heat transfer. Because tungsten is a rare metallic element with an extremely high melting point (approximately 3410° C.), the electrode can withstand a tremendous heat load and use the heat to join metals with filler material. The heat generated, however, can cause the welding torch to become increasingly heated. A cooling system is typically required to prevent overheating of the torch. Generally, the welding torch is liquid-cooled with coolant, such as water, which is supplied from a coolant source remote from the power source. The welding torch may also be air cooled.

One of the drawbacks with these standard cooling systems is that the cooling system is manually operable. That is, a typical cooling system is equipped with an ON/OFF switch that requires an operator to manually turn on the cooling system at the commencement of the welding process. When the cooling system is activated, coolant is unconditionally caused to circulate through the welding torch. It can therefore be problematic if situations arise that inhibit the proper flow of coolant go unnoticed. For example, pressure variations in the cooling system may be indicative of undesirable coolant blockage. If not corrected, the temperature of the torch may quickly rise to an unacceptable level yielding torch breakdown and malfunction.

Another disadvantage of known cooling systems rests in that the operator may turn on the cooling system and cause the flow of coolant without the welding torch being connected to receive coolant. As a result, coolant flow from the coolant source to the ambient may be unrestrictive thereby causing coolant waste and added clean-up time both of which negatively affect welding efficiency.

Therefore, it would be desirable to design a cooling system that determines if a welding-type component is connected to a coolant source and only permits coolant flow if a connection is properly determined. It would be further desirable to design a system whereby cooling parameters are monitored to verify proper coolant flow.

BRIEF DESCRIPTION OF INVENTION

The present invention solves the aforementioned problems by providing a cooling system with associated circuitry and sensory devices that permits coolant to flow in a torch of a welding system only if a torch is deemed connected to a coolant source. The system further supports the on-demand flow of coolant such that upon commencement of the welding process, i.e. when a welding arc is struck between an electrode and a workpiece, coolant automatically circulates to the torch.

There are a large number of welding processes available for use in industry. These welding processes include gas tungsten arc, oxygen gas welding, and shielded metal arc welding. The gas tungsten arc welding process is generally referred to as TIG (tungsten inert gas) welding. A typical TIG welding apparatus includes a welding component which is commonly referred to as welding torch and is designed to introduce a tungsten electrode to a weld. The welding torch holds the electrode which is heated to extremely high temperatures by electrical power received from the power source. The welding torch is designed to introduce the electrode to a weld. At appropriate voltage and current, a welding arc is created between the electrode and the workpiece. The torch typically includes a trigger mechanism for initiating the welding process, i.e., closing the circuit between the workpiece and the power source.

Therefore, in accordance with one aspect of the present invention, the cooling system includes a coolant source and a coolant supply outlet fluidly connected to the coolant source. The system further includes a coolant supply conduit fluidly connected to the coolant supply outlet and connectable to a welding-type component. The cooling system further includes a sensing device positioned in relative proximity to the coolant outlet and configured to provide an output indicative of connection status of the welding-type component to the coolant supply outlet.

In accordance with another aspect of the present invention, a welding system is provided and includes a welding torch configured to deliver an electrode to a weld as well as a power source connected to the welding torch and designed to condition raw power into a form usable by a welding process. The welding system further includes a cooler connected to the welding torch and designed to circulate coolant to the welding torch. A controller is provided and configured to detect a connection status of the welding torch to the cooler and regulate the cooler such that coolant is prevented from circulating if the welding torch is disconnected from the cooler.

According to another aspect of the present invention, a controller is provided and designed to detect connection of a welding-type component to a coolant source. The controller is further configured to permit circulation of coolant through the welding-type component upon activation of the welding-type component if the welding-type component is deemed connected to the coolant source.

In accordance with yet a further aspect of the present invention, a welding-type apparatus is provided. The welding-type apparatus includes means for cooling as well as means for providing welding-type power. The apparatus also includes means for outputting welding-type power to an output area and means for detecting connection of the means for outputting welding-type power to the means for cooling. The apparatus also includes means for automatically circulating coolant through at least the means for providing welding-type power upon activation of the means for outputting welding-type power only if the means for detecting detects connection of the means for outputting power to the means for cooling.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
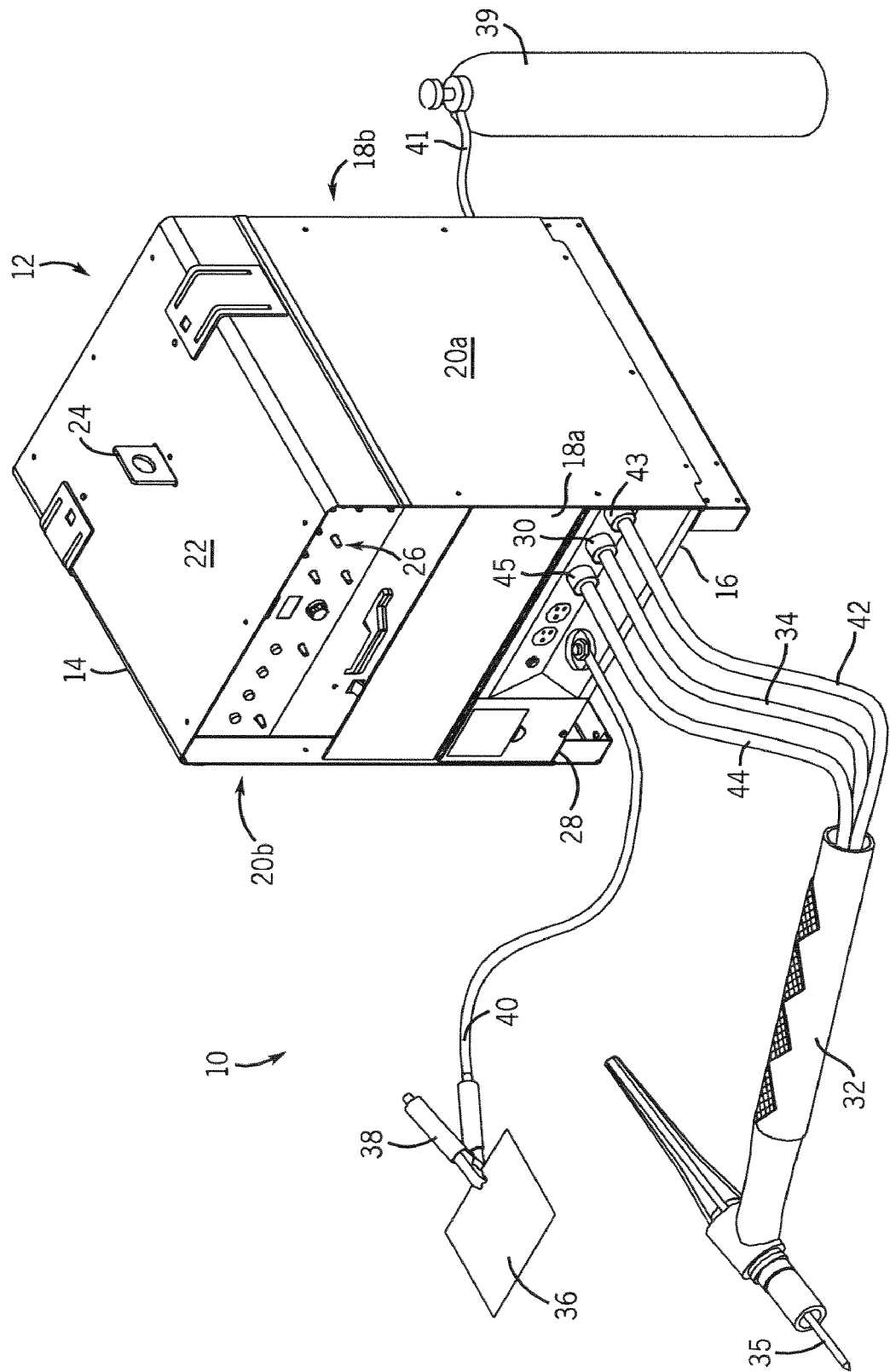
FIG. 1 is a perspective view of a welding-type system incorporating the present invention.

FIG. 1 is a perspective view of a welding-type system 10 suitable for a number of welding processes including tungsten inert gas (TIG) welding and stick welding. The welding-type system 10 includes a power source 12 disposed within an enclosure 14. Enclosure 14 is defined by a base 16, front and back panels 18a, 18b, and a pair of side panels 20a, 20b attached to the base 12. A top cover 22 having a handle 24 is secured to the pair of side panels 20a, 20b to form enclosure 14. The front panel includes control knobs 26 and outlets and receptacles 28 to facilitate connection of welding accessories to the enclosure. For example, an electrode weld output terminal 30 and, as will be described, a coolant return inlet, is used to connect a torch or other welding-type component 32 to the power source via cable-hose combination 34. The torch is designed to hold a tungsten electrode 35. To complete a welding circuit, a workpiece 36 is introduced to a weld by a clamp 38 that is also connected to the power source by cable 40. A gas cylinder 39 is used to store shielding gas which is provided to the power source 12 via supply hose 41. The power source controls the delivery of shielding gas to the torch via supply conduit 42, which is connected to enclosure 14 at terminal 43, during the welding process.

Enclosed in the enclosure 14 are the welding-type power source and a cooling system. The power source is constructed to condition raw power from a power supply into a power suitable for welding. In the preferred embodiment, the welding-type power supply and cooling system are disposed within the common enclosure 14. The cooling system is designed to circulate coolant through the torch 32 via coolant a circulation circuit that is formed of a coolant supply hose 44 and a coolant return path that is a part of cable-hose combination 34. The coolant system is designed such that coolant automatically flows into the torch through supply hose or conduit 44 from supply outlet 45 when the welding process begins, i.e., the torch is activated or an arc is struck, and the torch is properly connected to receive coolant. Coolant is then returned from the torch through the coolant return and coolant inlet 30 back to a coolant source. As mentioned above, cable-hose combination 34 includes an electrically conductive link to complete a welding circuit as well as a coolant return hose that are shrouded in a common sheath. The electrically conductive link may also be used to support transmission of feedback from the weld to the power source. It is further contemplated that the coolant return hose may be separately housed from the electrically conductive link. For instance, the cooling system may be remote from the power source and as such the coolant supply and return hoses would be connected to the cooling system whereas the electrically conductive link would be connected to the power source.

Figure 2:
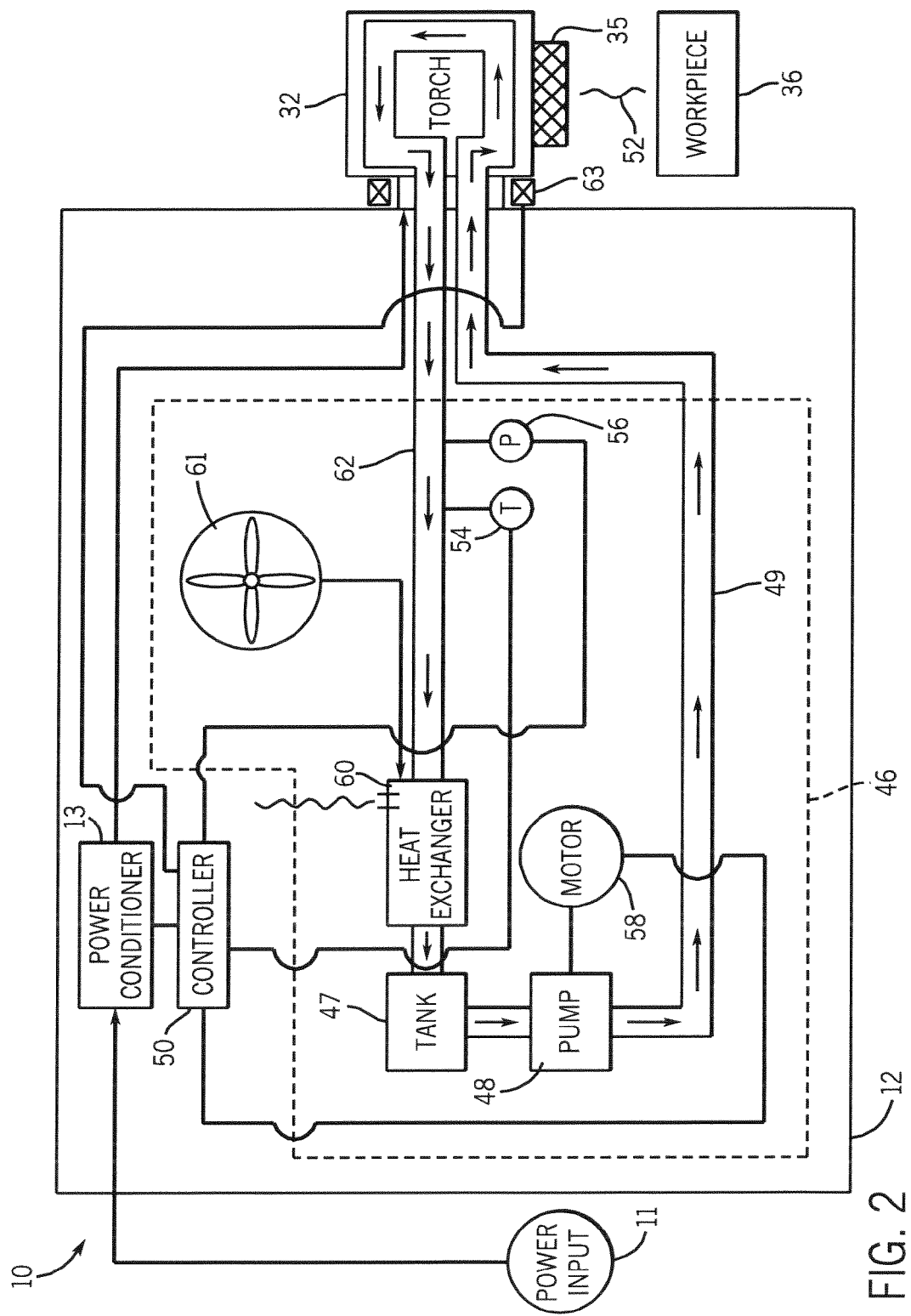
FIG. 2 is a block diagram of a welding system in accordance with one aspect of the present invention.

FIG. 2 is a block diagram of a welding system 10 designed to condition raw power from a raw power input 11 into a form usable in a welding-type process. The system includes power source 12, a power conditioning or transformer assembly 13, a TIG torch 32, a work piece 36, and a cooling system 46. The cooling system 46 includes a coolant tank 47 and pump assembly 48 designed to pump fluid from the tank to heat zones in the welding system, such as the electrode holder or torch 32, in response to control signals from controller 50. It is contemplated that the cooling system 46 may have a dedicated controller designed to regulate operation of the cooling system and communicate with a dedicated power source controller. For purposes of illustration, a single controller that controls operation of the power supply functions as well as cooling system functions will be described.

Further, it is contemplated that pump 48 or other circulation powering device may re-circulate fluid rather than pulling coolant from tank 47. The cooling system 46 is configured to adaptively circulate coolant to and from torch 32, if the torch is connected, upon activation. For example, if torch connection is verified, coolant circulation automatically begins when a welding arc 52 is struck between the tungsten electrode 35 and the workpiece 36.

Controller 50 is adapted to electronically determine connection of the torch to receive coolant and effectuate automatic commencement of coolant circulation to torch 32 when the welding process begins. The controller 50 is also connected to a temperature sensor 54 designed to provide feedback as to the temperature of the torch and/or the coolant within the torch as well as a pressure sensor or flow meter 56 to provide feedback regarding coolant pressure and flow in the system. In a further embodiment, the temperature sensor 54 provides temperature feedback to the controller such that circulation is maintained after a welding process is complete if the temperature exceeds a specified set point. Controller 50 may also include a timer that regulates or maintains coolant circulation for a specified period. The timer is designed to define a cool-down period of sufficient duration to allow the torch to cool.

Cooling system also includes a motor assembly 58 to drive pump 48 and a heat exchanger 60 and fan assembly 61 operationally connected to one another to remove the heat carried by the coolant from the torch. During one operational embodiment, the pump 48 draws coolant from tank 47 and delivers the coolant to torch 32 through coolant path 49, which is housed within coolant supply hose 44 of FIG. 1. The coolant absorbs heat from the torch and carries the heated coolant to heat exchanger via coolant return path 62, which is housed within cable-hose combination 34 of FIG. 1. The heat exchanger 60 may include a coiled radiator to remove the heat from the coolant to the surrounding atmosphere and dissipated by fan 61. The cooled coolant is then re-deposited in tank 47 and further allowed to cool before re-circulated back to torch 32. As illustrated, cooling system 46 is integrated within the welder or power source 12. However, the cooling system 46 may be a modular or portable unit separately mounted to the power source or other welding or transport equipment.

Cooling system 46 further includes a sensory or pick-up device 63 that provides feedback to controller 50 regarding a connection status of torch 32 to receive coolant. In a preferred embodiment, a coil having current passing therethrough is used to provide feedback as to connection of the torch. In this regard, when a metallic end of coolant hose is connectingly secured to the coolant source and therefore placed in proximity to the coil, the current flowing through the coil will vary as a result of the electromagnetic properties of the coil and metallic end of the coolant hose. As such, the controller from, the current flowing through the coil, is able to determine that the coolant hose is connected to the coolant outlet. It is contemplated, however, that additional sensory devices may be used to detect connection of the coolant hose to the coolant output. For instance, the coolant outlet may be equipped with a pressure switch that is engaged by the connecting end of the coolant hose when the coolant hose is connected to the coolant outlet. In this regard, the sensor may provide an output to the controller indicating that the switch has been activated. In a further embodiment, the coolant outlet may include a cover that is resiliently placed over the coolant outlet and is designed to be slidably removed from the coolant outlet when the coolant hose is connected to the coolant outlet. In this regard, sensors that respond to translation or otherwise movement of the cover may provide a signal indicative of cover plate displacement; which may be characterized by the controller as a connection of the coolant hose to the coolant outlet.

Figure 3:
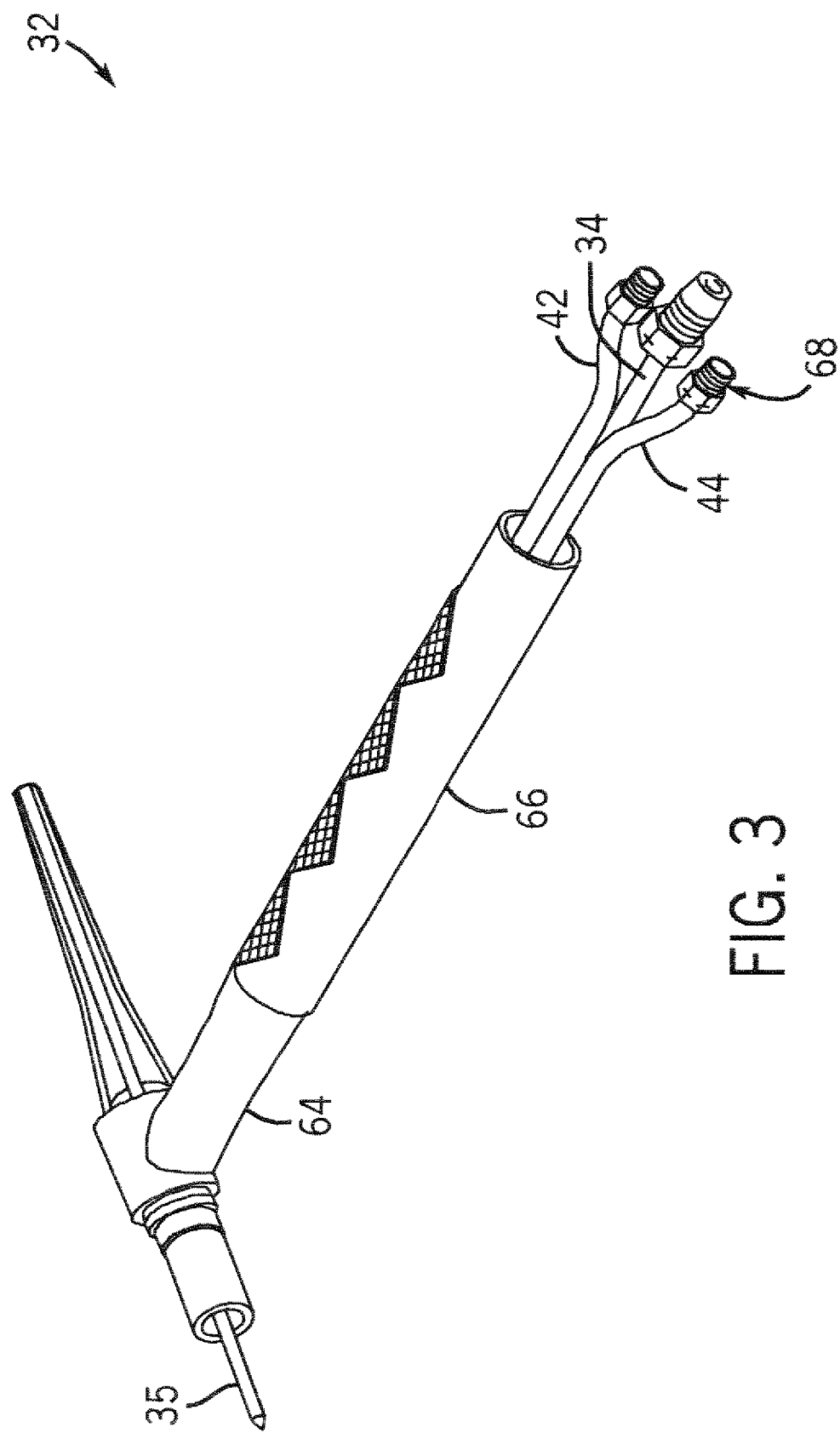
FIG. 3 is a perspective view of a welding torch for use with the present invention.

FIG. 3 illustrates torch 32 as having an elongated tubular body 64 connected to a handle 66. The handle 66 is relatively hollow which allows for extension of coolant supply hose 44, cable-hose composite 34, and gas hose 42. Hose 44 provides a coolant jacket or path that facilitates the ingress of coolant to the torch from the coolant source. Composite weld cable and coolant return hose 34 facilitate an electrical connection between the torch and power source but also support the egress of coolant from the torch back to the coolant source. As such, heat generated within the torch is carried away to prevent overheating of the torch. Gas hose 42 facilitates the flow of shielding gas to the weld from the power source. Coolant supply hose 44 includes a metallic connector 68 that engages the coolant supply outlet 45 of FIG. 1. As described above, the metallic connector 68 induces a measurable difference in current flow through sensory coil 63, FIG. 2. Based on the change, controller can reasonably conclude that the torch is connected to the coolant outlet.

Figure 4:
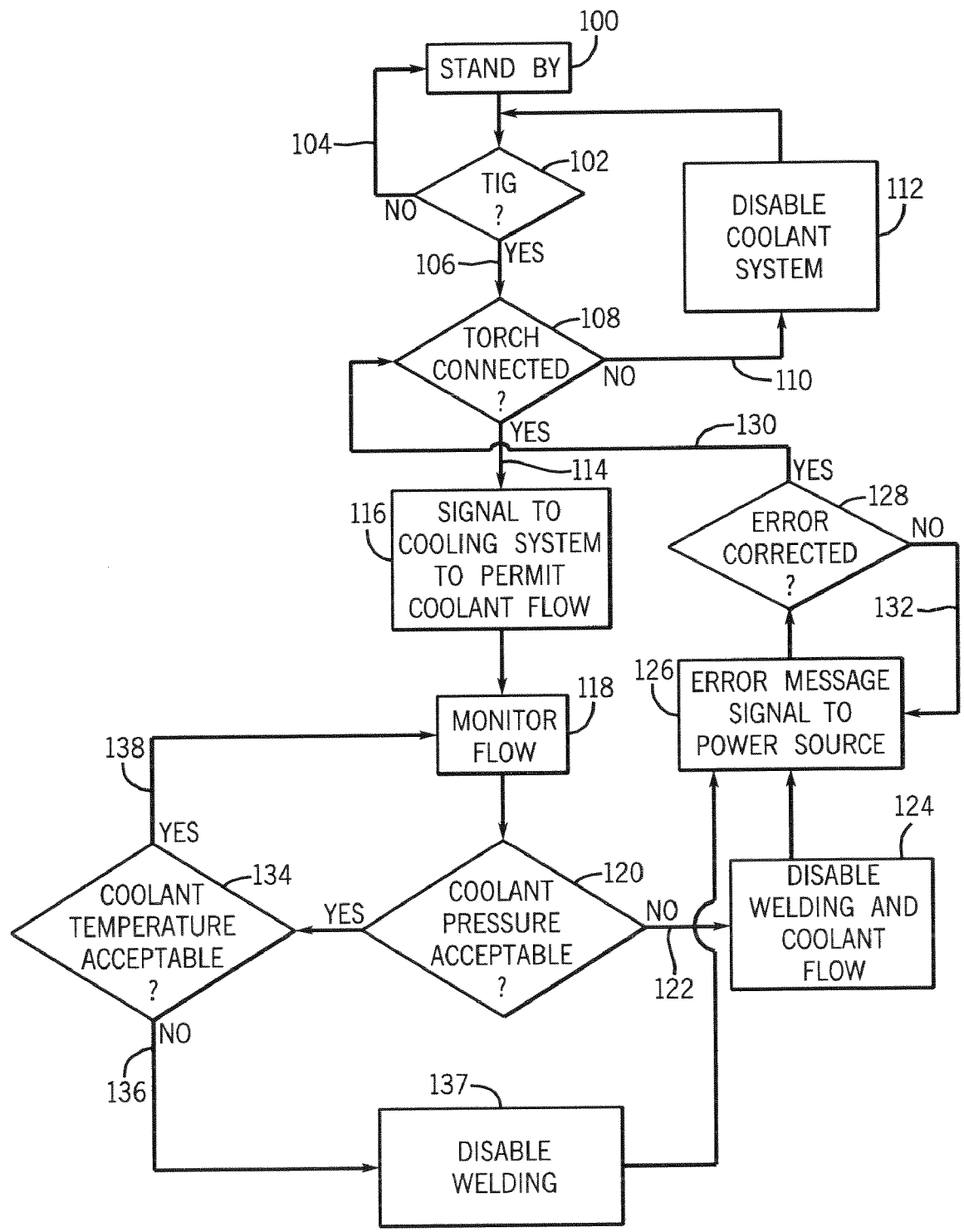
FIG. 4 is a flow chart setting forth the steps of a control algorithm for conditioned on-demand coolant circulation through components of a welding system in accordance with the present invention.

Referring now to FIG. 4, the steps of a control algorithm to adaptively regulate cooling of a torch are set forth. The process is preferably activated when the power source and cooling system are in a standby mode of operation 100. Once the user identifies the welding process to be used through appropriate switches on the power source, a determination is made at 102 whether a TIG welding process is to be carried out. Since some welding processes do not require coolant circulation and power sources are capable of carrying out more than one process, the aforementioned determination is preferred and reduces the likelihood that an operator would forget to activate the cooling system for a TIG welding session. If a TIG welding process is not selected 102, 104, the process loops back until a TIG mode is identified. If a TIG welding project is to be undertaken 102, 106, the controller 50 then determines whether the welding torch is connected to receive coolant 108 based on sensory data provided by connection sensor previously described. If a torch connection is not deemed present 108, 110, the cooling system is disabled 112. In this regard, the present invention is applicable with air-cooled welding torches and other air-cooled welding-type components. That is, the cooling system is controlled not to circulate coolant unless a torch is deemed connected to the coolant outlet. As such, if an air-cooled torch is connected to the power source, the power source will operate accordingly, but the cooling system will be disabled. However, if a torch is detected as connected 108, 114, a permit coolant flow signal is provided 116 to the cooling system to support on-demand coolant circulation. That is, coolant is to flow automatically upon welding commencement, i.e., a welding arc 52 has been struck between the welding torch 32 and the work piece 36. The controller 50 transmits a circulation commencement signal to the cooling system 46 to activate motor 58 and pump 48 such that coolant is circulated through the welding torch automatically upon initiation of the welding process.

The control algorithm is also designed to monitor coolant flow 118 for appropriate pressure and temperature readings. That is, data from a pressure sensor is acquired to determine if pressure in the system is acceptable 120. If not 120, 122, the controller prevents the motor and pump from providing a flow of coolant 124, and an error message is provided to the user and power source to disable the power source to support welding 126. In this regard, the cooling system controller is designed to either prevent welding or prompt a control signal to a dedicated power source controller to prevent welding. Coolant flow and, preferably, welding are disabled until the error condition is corrected 128. If corrected 128, 130, the control loop returns to step 108 to verify the torch as being connected. Re-verification is preferred as the torch may have been disconnected when correcting the error condition. If the error is not corrected 128, 132 an error signal is continuously provided 126.

The controller also receives coolant temperature feedback from one or more temperature sensors to determine if coolant temperature has reached an unacceptable level 134. If the temperature is outside an acceptable range 134, 136, the error notification process heretofore described commences and, preferably, the power source is disabled 137 from providing a welding output. If the coolant temperature is acceptable 134, 138, the controller continues to monitor coolant flow 118.

The heretofore described steps are to be repeatedly executed by one or more processors. For example, the steps of the algorithm are carried out repeatedly every 10 ms by a microprocessor in the power source or cooling system. As such, once the cooling system is placed in stand-by mode, the controller repeatedly determines a torch connection status before allowing coolant flow.

Therefore, in accordance with one embodiment of the present invention, the cooling system includes a coolant source and a coolant supply outlet fluidly connected to the coolant source. The system further includes a coolant supply conduit fluidly connected to the coolant supply outlet and connectable to a welding-type component. The cooling system further includes a sensing device positioned in relative proximity to the coolant outlet and configured to provide an output indicative of connection status of the welding-type component to the coolant supply outlet.

In accordance with another embodiment of the present invention, a welding system is provided and includes a welding torch configured to deliver an electrode to a weld as well as a power source connected to the welding torch and designed to condition raw power into a form usable by a welding process. The welding system further includes a cooler connected to the welding torch and designed to circulate coolant to the welding torch. A controller is provided and configured to detect a connection status of the welding torch to the cooler and regulate the cooler such that coolant is prevented from circulating if the welding torch is disconnected from the cooler.

According to another embodiment of the present invention, a controller is provided and designed to detect connection of a welding-type component to a coolant source. The controller is further configured to permit circulation of coolant through the welding-type component upon activation of the welding-type component if the welding-type component is deemed connected to the coolant source.

In accordance with yet a further embodiment of the present invention, a welding-type apparatus is provided. The welding-type apparatus includes means for cooling as well as means for providing welding-type power. The apparatus also includes means for outputting welding-type power to an output area and means for detecting connection of the means for outputting welding-type power to the means for cooling. The apparatus also includes means for automatically circulating coolant through at least the means for providing welding-type power upon activation of the means for outputting welding-type power only if the means for detecting detects connection of the means for outputting power to the means for cooling.

As one skilled in the art will fully appreciate, the heretofore description of welding devices not only includes welders, but also includes any system that requires high power outputs, such as heating and cutting systems. Therefore, the present invention is equivalently applicable with any device requiring high power output, including welders, plasma cutters, induction heaters, and the like. Reference to welding power, welding-type power, or welders generally, includes welding, cutting, or heating power. Description of a welding apparatus illustrates just one embodiment in which the present invention may be implemented. The present invention is equivalently applicable with many high power systems, such as cutting and induction heating systems, or any similar systems.

The present invention has been described in terms of the preferred embodiment, and it is recognized that equivalents, alternatives, and modifications, aside from those expressly stated, are possible and within the scope of the appending claims.

The invention claimed is:

1. A cooling system comprising:
   a coolant source;
   a coolant supply outlet fluidly connected to the coolant source;
   a coolant conduit fluidly connected to the coolant supply outlet and connectable to a welding-type component configured to present an electrode to a weld-type area; and
   a sensing device positioned in relative proximity to the coolant supply outlet and configured to provide a component connection status output indicative of connection status of the welding-type component to the coolant supply outlet; and
   a controller adapted to maintain coolant circulation if a temperature of the coolant exceeds a set point temperature.

2. The cooling system of claim 1 wherein the controller is further adapted to automatically terminate a welding-type output if a temperature of coolant is outside an acceptable temperature range.

3. The cooling system of claim 1 further comprising a coolant return inlet fluidly connected to the coolant conduit to return coolant from the welding-type component to the coolant source.

4. The cooling system of claim 1 further comprising a coolant pump, a motor assembly, a heat exchanger, and a fan operationally connected to one another to circulate coolant to the welding-type component.

5. The cooling system of claim 1 wherein the sensing device is further configured to provide a component disconnection output upon disconnection of the welding-type component from the coolant supply outlet.

6. The cooling system of claim 1 disposed within an enclosure having components to condition raw power into power usable by a welding-type process.

7. The cooling system of claim 1 wherein the sensing device includes at least one of a magnetic pick-up device, an electrically conductive coil, a sensor to detect movement of a coolant outlet cover, and a pressure switch designed to output a connection verification signal when engaged by a connecting end of the welding-type component.

8. The cooling system of claim 1 further comprising a pressure sensor to provide feedback as to at least one of coolant pressure and coolant flow through at least one of the coolant supply outlet and the coolant conduit.

9. A cooling system comprising:
   a coolant source;
   a coolant supply outlet fluidly connected to the coolant source;
   a coolant conduit fluidly connected to the coolant supply outlet and connectable to a welding-type component configured to present an electrode to a weld-type area;
   a sensing device positioned in relative proximity to the coolant supply outlet and configured to provide a component connection status output indicative of connection status of the welding-type component to the coolant supply outlet; and
   a controller adapted to electronically communicate with the sensing device to receive the component connection status output prior to activation of the welding-type component and to automatically affect circulation of coolant from the coolant source through the coolant supply outlet and the coolant conduit to the welding-type component when the connected welding-type component is activated.

10. The cooling system of claim 9 wherein the controller is further adapted to affect circulation of coolant from the coolant source through the coolant supply outlet and the coolant conduit only when the welding-type component is connected to the coolant supply outlet.

11. The cooling system of claim 9 wherein the controller is further adapted to maintain coolant circulation if a temperature of the coolant exceeds a set point temperature.

12. The cooling system of claim 11 wherein the controller is further adapted to automatically terminate a welding-type output if a temperature of coolant is outside an acceptable temperature range.

13. The cooling system of claim 9 further comprising a coolant return inlet fluidly connected to the coolant conduit to return coolant from the welding-type component to the coolant source.

14. The cooling system of claim 9 further comprising a coolant pump, a motor assembly, a heat exchanger, and a fan operationally connected to one another to circulate coolant to the welding-type component.

15. The cooling system of claim 9 wherein the sensing device is further configured to provide a component disconnection output upon disconnection of the welding-type component from the coolant supply outlet.

16. The cooling system of claim 9 disposed within an enclosure having components to condition raw power into power usable by a welding-type process.

17. The cooling system of claim 9 wherein the sensing device includes at least one of a magnetic pick-up device, an electrically conductive coil, a sensor to detect movement of a coolant outlet cover, and a pressure switch designed to output a connection verification signal when engaged by a connecting end of the welding-type component.

18. The cooling system of claim 9 further comprising a pressure sensor to provide feedback as to at least one of coolant pressure and coolant flow through at least one of the coolant supply outlet and the coolant conduit.

19. A welding system comprising:
a welding torch configured to deliver an electrode to a weld;
a power source connected to the welding torch and designed to condition raw power into a form usable by a welding process;
a cooler connected to the welding torch and designed to circulate coolant to the welding torch;
a temperature sensor to provide feedback as to a temperature of coolant circulating;
a controller configured to receive a coolant temperature signal from the temperature sensor and if coolant temperature exceeds a threshold, transmit a power source shut-down signal to the power source; and
wherein the controller is further configured to detect a connection status of the welding torch to the cooler prior to circulation of the coolant to the welding torch and regulate the cooler such that coolant is prevented from circulating if the welding torch is disconnected from the cooler.

20. The welding system of claim 19 wherein the cooler includes a torch connection sensor configured to transmit a torch connected signal to the controller when the welding torch is connected to the cooler.

21. The welding system of claim 20 wherein the torch connection sensor includes at least one of a magnetic pick-up device, an electrically conductive coil, a sensor to detect movement of a coolant outlet cover, and a pressure switch designed to output a connection verification signal when engaged by a connecting end of the welding-type component.

22. The welding system of claim 19 further configured for TIG welding.

23. A welding system comprising:
a welding torch configured to deliver an electrode to a weld;
a power source connected to the welding torch and designed to condition raw power into a form usable by a welding process;
a cooler connected to the welding torch and designed to circulate coolant to the welding torch;
a pressure sensor to provide feedback as to pressure of coolant circulating;
a controller further configured to receive a coolant pressure signal from the pressure sensor and if coolant pressure is outside an acceptable range, transmit a shut-down signal to the power source; and
wherein the cooler includes a torch connection sensor configured to transmit a torch connection signal to the controller when the welding torch is connected to the cooler, the torch connection signal acquired absent circulation of the coolant.

24. The welding system of claim 23 wherein the torch connection sensor includes at least one of a magnetic pick-up device, an electrically conductive coil, a sensor to detect movement of a coolant outlet cover, and a pressure switch designed to output a connection verification signal when engaged by a connecting end of the welding-type component.

25. The welding system of claim 23 further comprising a temperature sensor to provide feedback as to a temperature of coolant circulating.

26. The welding system of claim 25 wherein the controller is further configured to repeatedly detect a coolant temperature signal and if coolant temperature exceeds a threshold, transmit a power source shut-down signal to the power source.

27. The welding system of claim 23 further configured for TIG welding.

28. A controller and sensing device combination configured to:
detect connection of a welding-type component to a coolant source; and
upon connection, permit circulation of coolant through the welding-type component only upon activation of the welding-type component.

29. The controller and sensing device combination of claim 28 further configured to monitor a pressure of circulation through the welding-type component and if the pressure is at an unacceptable level, provide a detectable output indicative of errant coolant flow.

30. The controller and sensing device combination of claim 28 further configured to monitor a temperature of coolant through the welding-type component and if the temperature has an unacceptable value, provide a detectable output indicative of errant coolant temperature.

31. A welding-type power source connectable to a welding-type component designed to deliver a welding-type power to a welding-type work area, the power source comprising:
means for cooling;
means for providing welding-type power;
means for outputting welding-type power to an output area;
means for detecting connection of the outputting welding-type power means to the cooling means; and
means for automatically circulating coolant through at least the welding-type power means upon activation of the outputting welding-type power means only if the detecting means detects connection of the outputting welding-type power means to the cooling means.

* * * * *